United States Patent [19]

Sumitani

[11] 4,201,794
[45] May 6, 1980

[54] POWDER COMPOSITION FOR SOFT DRINK

[75] Inventor: Kenji Sumitani, Ikuno, Japan

[73] Assignee: Kawakami Kagaku Kogyo Company Ltd., Osaka, Japan

[21] Appl. No.: 940,142

[22] Filed: Sep. 6, 1978

[30] Foreign Application Priority Data

Jul. 21, 1978 [JP] Japan .................................. 53-89703

[51] Int. Cl.² .............................................. A23L 2/00
[52] U.S. Cl. ..................................... 426/96; 426/103; 426/104; 426/250; 426/590
[58] Field of Search ................. 426/590, 250, 96, 104, 426/103

[56] References Cited

PUBLICATIONS

Color Additives, Packer/Processor 6/68 Kinnison.
Consumers Dictionary of Food Additives Winter, Crown Publish. 1972 p. 60.

Primary Examiner—Steven L. Weinstein
Attorney, Agent, or Firm—Browdy and Neimark

[57] ABSTRACT

A powder composition which comprises an anthraquinonoid compound, one or more sorts of organic acids and one or more sorts of alkaline salts wherein the acid(s) or the salt(s) is (are) coated with water-soluble substance(s) so that the PH value of the solution into which the powder has been projected be suddenly changed in order to bring about a sudden change of the color of anthraquinonoid in the solution.

2 Claims, No Drawings

POWDER COMPOSITION FOR SOFT DRINK

This invention relates to a powder composition for soft drink, a color of which changes on standing.

Natural quinonoid colors such as a carminic acid and a laccaic acid have been used for coloring of drinks and such foods as noodle, ham, sausage and pickles. It is known that a shade of the color changes under various influences, for example, PH value, metallic ions and proteins. Some stabilizers have been added to the drinks and the foods to keep the shade against the undesired influences.

This invention turns the color changeability of said quinonoids to advantage. The object of this invention is to tender a powder composition for a novel soft drink the color of which changes suddenly before being drunk. The other object of this invention is to provide with a soft drink which give them a refreshing astonishment and appetite.

The all components of the composition are powdery, i.e. pulverized or granulated. Edible organic acid(s) such as citric acid and dl-malic acid and edible alkaline salt(s) such as sodium bicarbonate and sodium trimetaphosphorate coexist with the edible quinonoid color, desirably anthraquinonoid color.

Said organic acid(s) or said alkaline salt(s) is (are) coated with a proper watersoluble material(s) chosen from edible sacchardies and synthetic pastes. Examples of the saccharides are mono saccharide, oligosaccharide, polysaccharide and derivatives of saccharide such as dextrin, xanthan gum and "pullulan" (trade mark of a partially hydrolyzed glucan, MW: 50,000~100,000 made by a Japanese company "Hayashibara Biochemistry Co., Ltd.")

Examples of the synthetic pastes are carboxymethyl cellulose (CMC) and sodium alginate.

Said uncoated color and acid(s) or salt(s) dissolve instantly into water, but said coated salt(s) or acid(s) is (are) delaid to dissolve. Accordingly, the PH value of the solution changes rather suddenly on standing to change the shade of the color.

As the natural quinonoid color in this invention, such anthraquinonoid colors as carminic acid and laccaic acid are desirably preferred because of their water-solubility and nonpoisonousness.

Organic acids contained in fruits, for example, citric acid and malic acid are suitable for giving a moderate sourness to the drink the all components of which have fully dissolved. As for sweetener, synthetic sweeteners also are available besides natural saccharides such as grape sugar and cane sugar. Known flavorings also are contained in the powder composition. l-Menthol, lime flavor and orange flavor are available. Said lime or orange flavor is, as known, prepared by drying a mixed solution of dextrin and the lime oil or orange oil to form a powder.

Known various methods can be applied in coating the organic acid(s) or the alkaline salt(s). In the spray-drying system, the fine powders of the acid(s) or salt(s) which are cores to be coated are fed into a tower, and compressed air is forced into the powders. The fine powders are forcibly circulated in the tower to form a fluid layer into which a coating solution is intermittently sprayed. The solution sticks to the surface of the cores and are dryed. Coated granules of a diameter less than 0.5 millimeter are obtained in this manner.

Examples of this invention are now explained hereunder referring to the following table.

Table 1.

| Components | | Example 1. | Example 2. |
|---|---|---|---|
| color (gram) | | carminic acid, 100 | laccaic acid, 50 |
| PH regulators (gram) | uncoated | NaHCO₃, 200 | dl-malic acid, 150 |
| | coated | citric acid without crystal water, 250 | sodium trimetaphosphorate, 390 |
| | coating material | CMC 4.25 | "Pullulan" 7 |
| flavorings (gram) | | l-menthol 30 orange flavor 2500 | l-menthol 30 lime flavor 2500 |
| Sweeteners (kilogram) | | grape sugar 60 cane sugar 50 | grape sugar 64 cane sugar 50 |
| PH value and shade | just after projection | PH 6.20 purplish red | PH 4.50 orange-colored |
| | 15~20 second after projection | PH 4.35 yellowish orange-colored | PH 6.20 purplish red |

The total weight of the composition of the Example 1 is 113,084 grams which is equivalent to 5,654 cups of soft drink each containing 20 g of dryed powder. The total weight of the Example 2 is 117,127 grams similarly equivalent to 5,856 cups.

There are shown in Table 1 PH values when 20 grams of the powder compositions are projected into 140 milliliter of water. CMC (carboxymethyl cellulose) in Example 1 has a substitution degree 0.75, and a viscosity of 10 weight percent aqueous solution of which is 1,200 to 1,400 centipoises (at 20° C.).

"Pullulan" in Example 2 is a partially hydrolyzed starch, the molecular weight being 50,000 to 100,000. The hydrolysis is catalyzed with "pullulan 6-glucanohydrolose" extracted from "enterobacter aerogenes".

These coating materials are, accordingly, soluble in water, and dissolve at 15 to 20 second after projection.

The scope of this invention is not restricted to the foregoing examples. The ratio of the coating material to the core of PH regulator can be changed to determine at will the time when the PH of soft drink changes. If plurality of the coating materials the desolving rates of which are different is involved, a soft drink whose shade changes stepwise is obtained.

As described above, the powder composition of this invention is used for preparation of color-changeable soft drinks. The drinks change their color stepwise and suddenly between two or nore shades, before being drunk and give not only a refreshing astonishment and appetite to them who will drink the drinks but also a visual satisfaction creating the illusion of taking at the same time two or more kinds of drinks, for instance, grape juice and orange juice.

What is claimed is:

1. An edible powder composition for making soft drinks which comprises a powdery water-soluble color chosen from the group (I) of anthraquinonoids; PH regulators consisting of one or more powdery organic acids chosen from the group (II) and one or more powdery alkaline salt(s) chosen from the group (III), wherein either of the PH regulators, but not the anthraquinonoid, is coated with one or more water-soluble coating materials of group (IV) to change suddenly the shade of soft drink through a sudden change of PH value below 7 at a predetermined time after the powder composition is placed in water:

Group (I);
    carminic acid, laccaic acid,

Group (II);
    citric acid, dl-malic acid,
Group (III);
    sodium trimetaphosphorate, sodium bicarbonate, and
Group (IV);
    saccharides, dextrin, xanthan gum, pullulan, carboxymethyl cellulose, sodium alginate.

2. A powder composition for soft drink in accordance with claim 1, further comprising one or more powdery sweeteners chosen from the group (V) and one or more powdery flavorings chosen from the group (VI):
Group (V);
    natural saccharides, synthetic sweeteners, and
Group (VI);
    l-menthol, lime flavor, orange flavor.

* * * * *